United States Patent [19]

Kumagai et al.

[11] Patent Number: 5,724,188

[45] Date of Patent: Mar. 3, 1998

[54] LENTICULAR LENS SHEET

[75] Inventors: Yoshihiro Kumagai; Ichiro Matsuzaki, both of Niigata, Japan

[73] Assignee: Kuraray Co., Ltd., Kurashiki, Japan

[21] Appl. No.: 675,903

[22] Filed: Jul. 5, 1996

[30] Foreign Application Priority Data

Jul. 10, 1995 [JP] Japan ................................. 7-173260

[51] Int. Cl.⁶ .................................................. G02B 27/10
[52] U.S. Cl. ........................................... 359/619; 359/455
[58] Field of Search .................................. 359/621, 454, 359/455, 456, 457, 458, 619

[56] References Cited

U.S. PATENT DOCUMENTS 5,420,720  5/1995  Gal et al. ............................. 359/621

*Primary Examiner*—David C. Nelms
*Assistant Examiner*—Thomas Robbins
*Attorney, Agent, or Firm*—Oblon, Spivak, McClelland, Maier & Neustadt, P.C.

[57] ABSTRACT

A double-faced lenticular lens sheet including at least one incident side lens formed on a first face of the double-faced lenticular lens sheet; and at least one corresponding emergent side lens formed on a second opposite face of the double-faced lenticular lens sheet; wherein light rays incident on the at least one incident side lens parallel to an optical axis thereof pass through the lenticular lens sheet and emerge from the at least one emergent side lens; an angle of refraction θ1 is formed by a straight line parallel to an optical axis of the at last one incident side lens and a light ray refracted by an incident plane passing through the lenticular lens sheet; an angle of refraction θ2 is formed by a straight line parallel to an optical axis of the at least one emergent side lens and the light ray refracted by and emitted from an emergent plane; Δθ1 is an absolute value of the angle of refraction θ1 on the incident plane; Δθ2 is an absolute value of an angle of refraction given by (θ2-θ1) on the emergent plane; a ratio between Δθ1 and Δθ2 given by (Δθ2/Δθ1) is 1.0 or more when a center of the lenticular lens sheet rests on the optical axis of the at least one incident side lens and a width of the lenticular lens sheet is 80% or less of the lens pitch of the at least one incident side lens.

3 Claims, 3 Drawing Sheets

LENTICULAR LENS SHEET

BACKGROUND OF THE INVENTION

1. Field of the Invention

The present invention relates to lenticular lens sheets for use in transmission type screen of a rear projection type television, and more particularly to a lenticular lens sheet to be used in the rear projection type television which is provided with lenticular lenses of fine pitch and which uses a liquid crystal display panel.

2. Disclosure of the Prior Art

In the projection devices such as rear projection type television using a liquid crystal panel, moire patterns may occur because of the horizontally periodic structure of the pixels in the liquid panel as well as the lenticular lens of the transmission type screen. To avoid the moire patterns, it is known in the art to set the ratio between the pitch of the lenticular lens and the pitch of the image formed by the pixels of the liquid crystal panel on the transmission type screen at $1/(N+\frac{1}{2})$ (N is an integer of 1 or greater) (see Japanese Patent Application Laid-open No. Hei 2-97991). If N is 1, moire patterns must linger. It has therefore been a common practice to assign N to be 2 or greater. If N is 2 or greater, the pitch of the lenticular lens satisfying the above formula would be as small as 0.4 mm (N=2), 0.286 mm (N=3), 0.222 mm (N=4) if the pitch of the pixel image projected on the screen is 1.0 mm, necessitating the lenticular lens to have a very fine pitch.

With the three-tube type projectors, the ratio (d/p1), wherein p1 is the lens pitch on the incident side of a double-faced lenticular lens sheet that constitutes a transmission type screen and d is the distance between the lenses on the incident and the emergent sides, is usually set to fall within the range of 1.1–1.25 because the screen characteristics in the horizontal direction deteriorate when said ratio exceeds 1.3. If the pitch p1 on the incident side is as small as 0.4 mm, then said distance d would be as small as 0.44–0.5 mm.

Lenticular lens sheets are generally manufactured by extrusion molding using thermoplastic resin. In the case of extrusion molding, it is difficult to manufacture the sheet which thickness is under 0.44–0.5 mm so manufacture of double-faced lenticular lens with very fine pitch becomes difficult.

To manufacture lenticular lens sheets with fine thickness, it has been proposed to form lenses on the incident and emergent sides by extruding fine threads of molten resin (c.f. Japanese Patent Application Laid-open No. Hei 3-200948 and Japanese Patent Application Laid-open No. Hei 2-146536).

To reduce the lens pitch while maintaining the rigidity of the lens sheet, it has been proposed to manufacture single-faced lenticular lens of which incident side is made flat. Single-faced lenticular lenses pose yet another problem of insufficient contrast because of absence of black stripes on the emergent side.

OBJECTS AND SUMMARY OF THE INVENTION

The present invention has been contrived to overcome the above mentioned problems and aims at providing a lenticular lens sheet which has high performance in the horizontal direction and which can be easily manufactured by extrusion molding.

The present invention relates to a double-faced lenticular lens sheet comprising incident side lenses formed on one of the main faces and emergent side lenses formed on the other main face, such that light rays which are incident on the incident side lenses in parallel with the optical axis pass through the lenticular lens sheet and are emitted from the emergent side lenses.

Given an angle $\theta 1$ formed by a straight line parallel to the optical axis of the incident side lens and a light ray refracted by the incident plane to pass through the lenticular lens sheet, an angle $\theta 2$ between a straight line parallel to the optical axis of the emergent side lens and the light ray refracted by and emitted from the emergent plane, the absolute value of the angle of refraction on the incident plane ($\theta 1$) is expressed as $\Delta\theta 1$ and the absolute value of the angle of refraction on the emergent plane ($\theta 2$-$\theta 1$) is expressed as $\Delta\theta 2$. The present invention lenticular lens sheet is characterized in that the ratio between $\Delta\theta 1$ and $\Delta\theta 2$ ($\Delta\theta 2/\Delta\theta 1$) is 1.0 or more so long as the center is on the optical axis of the lens on the incident plane and the width is not greater than 80% of the lens pitch on the incident side.

In the present invention lenticular lens sheet, (a) given the distance d between the lenses on the incident and the emergent sides and the focal length f, it is preferable that the values d and f satisfy the following equation (1), $$d=kf \text{ (provided } 0.7 \leq k \leq 0.9) \tag{1}$$

When, on the other hand, (b) given the pitch of the incident side lens as 1 and when the sectional configuration of the emergent side lens is approximated by the following equation (2), $$y=cx^2/[1+\{1-(k+1)c^2x^2\}^{1/2}] \tag{2}$$

it is preferable that the shape factor c and the value k satisfy $c \geq 5.0$ and $k \leq -1.5$, respectively.

BRIEF DESCRIPTION OF THE DRAWINGS

The present invention can be more clearly understood from the following description of preferred embodiments made in conjunction with the accompanying drawings. It should be noted however that the preferred embodiments and the drawings are given for illustrative and explanatory purposes alone and should not be construed to limit the scope of the present invention. The scope of the present invention is defined by the appended claims.

DETAILED DESCRIPTION OF THE INVENTION

According to the present invention, the characteristic in the angle of field characteristic in the horizontal direction comparable to that of the prior art lenticular lens sheet can be obtained even when the distance between lenses on the incident side and the emergent side is greater as compared to the prior art (i.e. the lenticular lens sheet is thicker). The reasons for this will be described below by comparing the design methods of the prior art and the present invention.

In the present invention, the following three design policies are noted.

(A) The ratio between the absolute value $\Delta\theta_1$ of the angle ($\theta_1$) of the light ray refracted on the incident plane and the absolute value $\Delta\theta_2$ of the angle ($\theta_2-\theta_1$) of the light ray refracted on the emergent plane. In other words, the ratio between the refraction power on the incident side lens and that on the emergent side lens.

(B) The ratio between the focal length of the incident side lens and the distance between the lenses on the incident and the emergent sides.

(C) The sectional configuration of the emergent side lens.

Figure 3A:
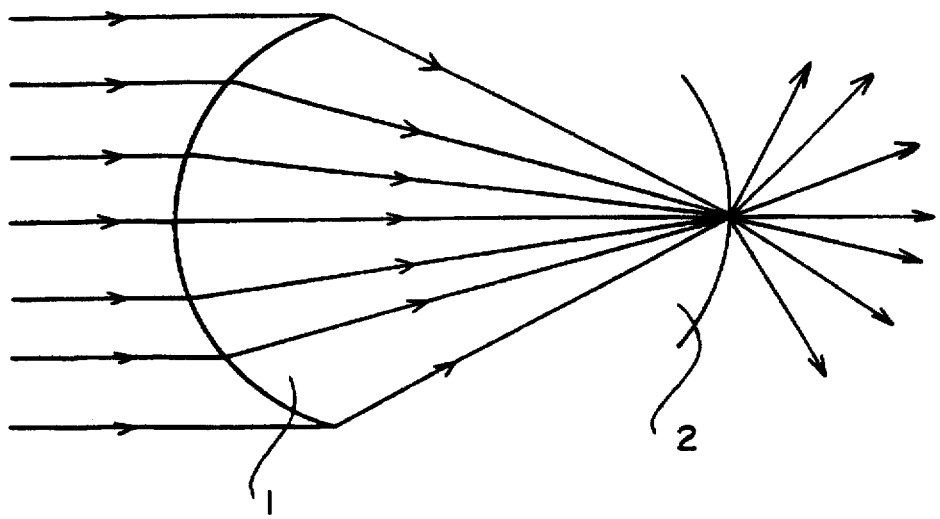
FIGS. 3A and 3B show the path of light incident on the incident side lens.

As for the design policy (A), explanation is given with respect to a double-faced lenticular lens sheet having both the incident and the emergent side lenses shown in FIG. 3. As shown in FIG. 3a, the sectional configurations of the lenses on both sides and the distance therebetween are so set in the prior art that the converging point of the light rays from the incident side lens falls on the surface of the emergent side lens.

Figure 2:
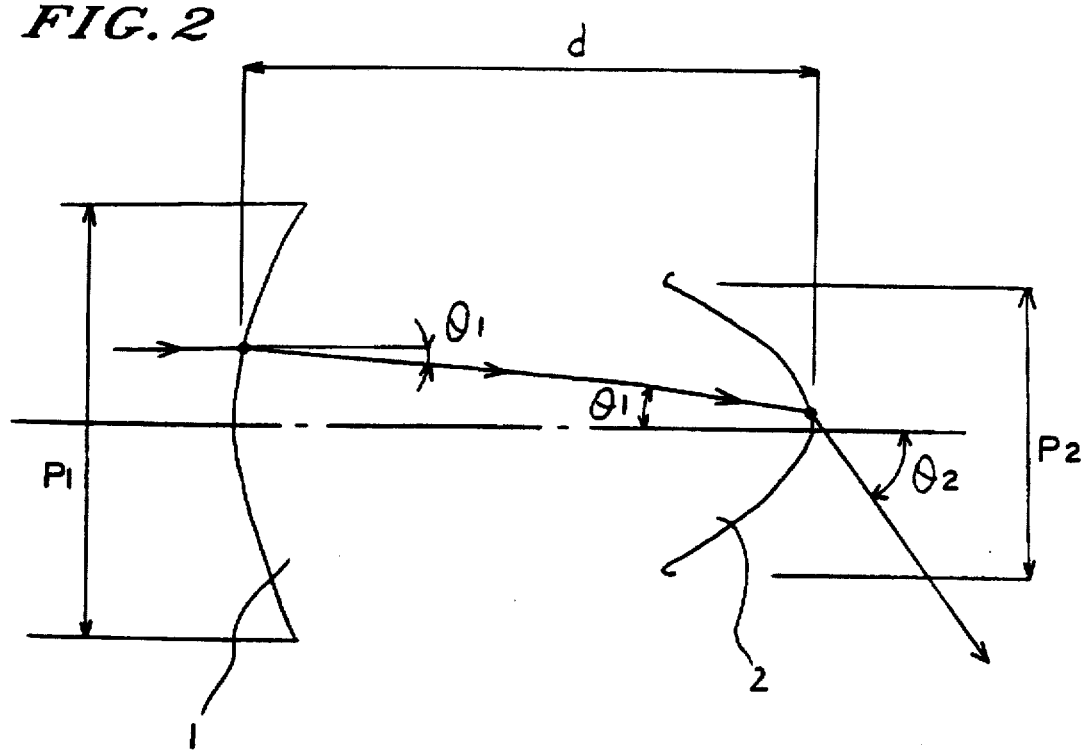
FIG. 2 shows the refraction angles in the present invention lenticular lens sheet.
Figure 1:
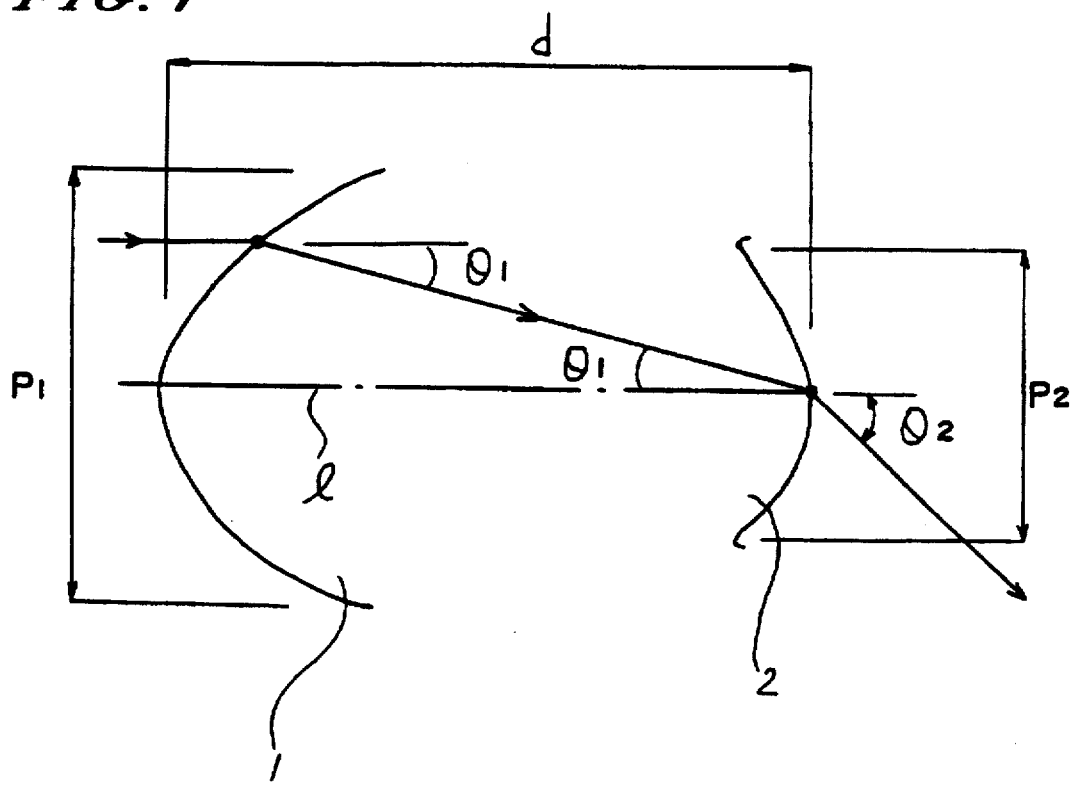
FIG. 1 shows the refraction angles in the prior art lenticular lens sheet.

With the lenticular lens sheet of the prior art design shown in FIG. 1, given an angle $\theta_1$ formed by the straight line parallel to the optical axis of the incident side lens and the light ray refracted by the incident plane to pass through the lenticular lens sheet, an angle $\theta_2$ between the straight line parallel to the optical axis of the emergent side lens and the light ray refracted by and emitted from the emergent plane, and the absolute value of the angle of refraction on the incident plane ($\theta_1$) is expressed as $\Delta\theta_1$ and the absolute value of the angle ($\theta_2-\theta_1$) of the light ray refracted on the emergent plane as $\Delta\theta_2$, then it holds that $\Delta\theta_1>\Delta\theta_2$ and $\Delta\theta_2/\Delta\theta_1<1$ when the center rests on the optical axis of the emergent side lens and the width is 80% or less of the pitch of the emergent side lens. In other words, it is so designed that the refraction power is greater on the incident side and smaller on the emergent side. When the distance between these two lenses is expressed as d, the ratio d/p1 between the distance d and the pitch PL of the incident side lens generally falls within the range of 1.1 to 1.25.

Figure 3B:
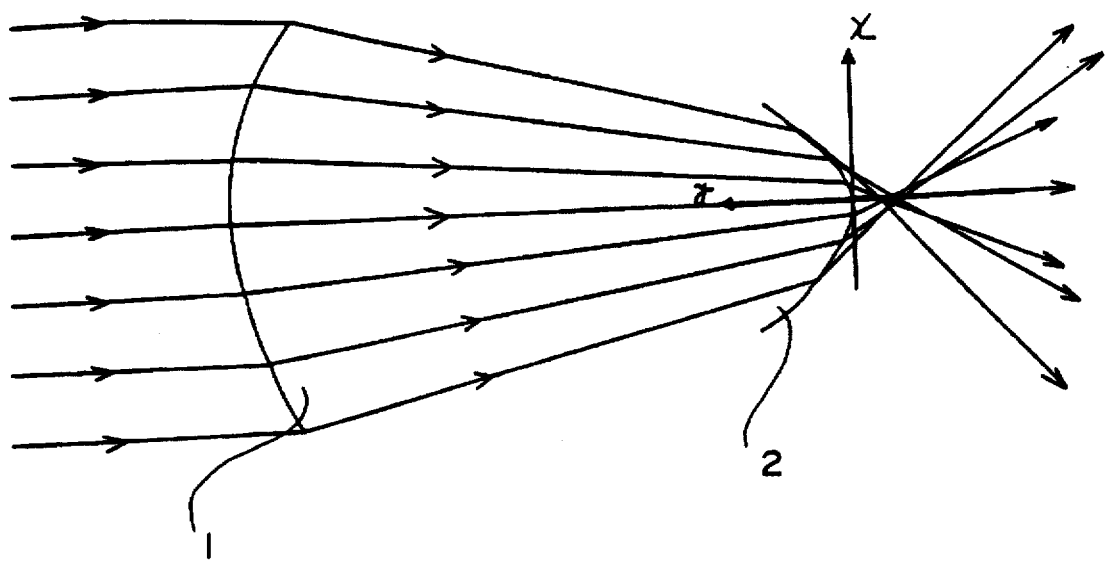
Figure 4:
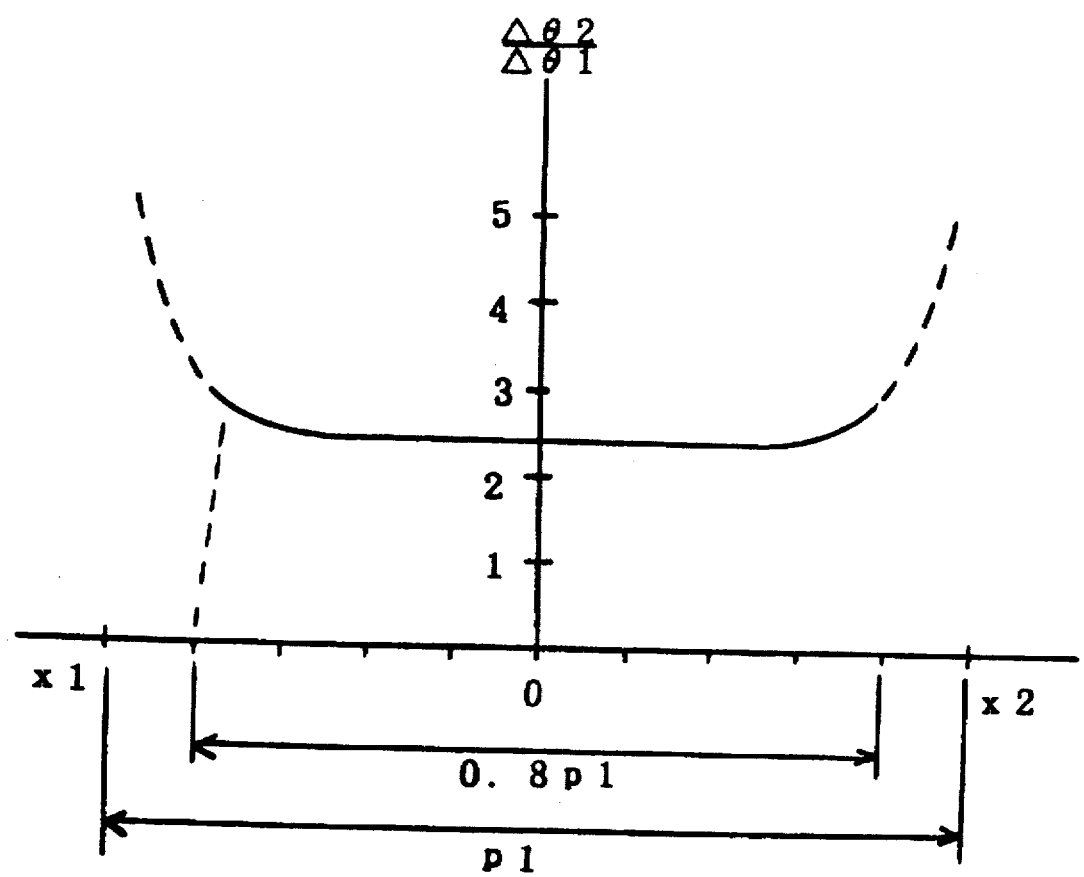
FIG. 4 shows an example of the relation $\Delta\theta 2/\Delta\theta 1$ and the distance from the origin in the pitch direction of the incident side lens.

According to the present invention shown in FIG. 3b, on the other hand, the incident side lens has a longer focal length. In other words, when the angles $\theta_1$ and $\theta_2$ are given in the manner shown in FIG. 1, said ratio $\Delta\theta_2/\Delta\theta_1$ is 1 or greater when the center rests on the optical axis of the incident side lens and the width is 80% or less of the pitch p1 (of the incident side lens) or p2 (of the emergent side lens). By so constructing, the angle of field characteristic in the horizontal direction which is comparable to that of the prior art lenticular lens can be obtained even if the ratio d/p1 between the lens distance d and the pitch p1 of the incident side lens is 1.6 to 1.9. FIG. 4 shows an example of the relation of $\Delta\theta_1$ and $\Delta\theta_2$. As shown in the figure, $\Delta\theta_2/\Delta\theta_1$ is 1 or greater so long as the center rests on the optical axis of the incident side lens and the width is 80% or less of the lens pitch p1 (the same relation holds on the emergent side).

Explanation with respect to the design policy (B) above is now given. In the prior art double-faced lenticular lens sheet, the sectional configuration of each of the lenses and the distance therebetween are so determined that the main focal point of the incident side lens falls on the surface of the emergent side lens. With this construction, it becomes necessary to increase the radius of curvature of the emergent side lens. If the radius of curvature is increased, however, the angle of field characteristic would disadvantageously deteriorate as the optical axes of the lenses on the incident and the emergent sides would deviate from each other.

According to the present invention lenticular lens sheet, the emergent side lens is arranged slightly closer to the incident side than said main focal point, so that the light rays refracted by the incident side lens do not converge on any one point on the opposing emergent side lens but reach the same uniformly over a wide range covering, for example, 70 to 80% of the entire surface around the optical axis and resulting in dispersion of the refraction power. This eliminates the need to increase the radius of curvature of the emergent side lens. Given the distance d between the lenses on the incident and the emergent sides and the main focal length f of the incident side lens, it is preferable that the ratio between the lens distance d and the focal length f (d/f) is 0.7 to 0.9.

Lastly, explanation with respect to the design policy (C) is given.

Whereas according to the prior art design of the lenticular lens sheet, the emergent side lens is formed as a portion of a circle, an ellipse or a parabola in its cross section, the emergent side lens according to the present invention is formed as a portion of a hyperbola, so that the angle of field characteristic in the horizontal direction can be secured. When such sectional configuration of the emergent side lens is approximated by the following equation by assuming that the pitch of the incident side lens is 1, $$y=cx^2/[1+\{1-(k+1)c^2x^2\}^{1/2}]$$

c should be 5 or greater and k should be −1.5 or less. In the above equation, x is the distance from the origin in the pitch direction and y is the distance from the origin in the height direction. The origin is the center of the emergent side lens (see FIG. 3b). With the emergent side lens in this configuration, the ratio of change in the inclination of the lens surface with respect to the distance in the pitch direction of the emergent side lens decreases from the inside toward the outside, decreasing the total reflection on the emergent side lens and securing the horizontal field of angle characteristic.

Table 1 shows different parameters of different lenticular lens sheets manufactured by varying the conditions of extrusion molding.

TABLE 1

| Embodiment Incident side Lens pitch p1 (mm) | lens distance d (mm) | Ratio d/p₁ | Shape factors | | | | Refraction power ratio $\Delta\theta_2/\Delta\theta_1$ |
|---|---|---|---|---|---|---|---|
| | | | incident lens | | emergent lens | | |
| | | | c | k | c | k | |
| 1  0.250 | 0.700 | 2.80 | 3.5 | −0.45 | 34 | −2.0 | 3.3 |
| 2  0.320 | 0.840 | 2.63 | 2.8 | −0.45 | 22 | −2.0 | 3.1 |
| 3  0.330 | 0.600 | 1.82 | 3.7 | −0.45 | 23 | −2.0 | 2.3 |

Screens in which the horizontal field of angle characteristic is substantially at practical level as shown in Table 2 were obtained by the use of lenticular lens sheets shown in Table 1.

TABLE 2

| | Angle at which the brilliance becomes ½ the peak gain | Angle at which the brilliance becomes ⅓ the peak gain | Angle at which the brilliance becomes ¹⁄₁₀ the peak gain |
|---|---|---|---|
| 1 | 30° | 35° | 46° |
| 2 | 32° | 37° | 49° |
| 3 | 32° | 38° | 50° |

What is claimed is:

1. A double-faced lenticular lens sheet, comprising
    at least one incident side lens formed on a first face of the double-faced lenticular lens sheet; and at least one corresponding emergent side lens formed on a second opposite face of the double-faced lenticular lens sheet;

wherein:

light rays incident on the at least one incident side lens parallel to an optical axis thereof pass through the lenticular lens sheet and emerge from the at least one emergent side lens;

an angle of refraction θ1 is formed by a straight line parallel to an optical axis of the at least one incident side lens and a light ray refracted by an incident plane passing through the lenticular lens sheet;

an angle of refraction θ2 is formed by a straight line parallel to an optical axis of the at least one emergent side lens and the light ray refracted by and emitted from an emergent plane;

Δθ1 is an absolute value of the angle of refraction θ1 on the incident plane;

Δθ2 is an absolute value of an angle of refraction given by (θ2-θ1) on the emergent plane;

the ratio between Δθ1 and Δθ2 given by (Δθ2/Δθ1) is 1.0 or more when a center of the lenticular lens sheet rests on the optical axis of the at least one incident side lens and a width of the lenticular lens sheet is 80% or less of the lens pitch of the at least one incident side lens.

2. The lenticular lens sheet as claimed in claim 1, wherein given a distance d between the at least one incident side lens and the at least one emergent side lens and a main focal length f of the at least one incident side lens, d and f satisfy the following equation:

$$d = k1 \cdot f,$$

wherein $0.7 \leq k1 \leq 0.9$.

3. The lenticular lens sheet as claimed in claim 1 or 2, wherein a sectional configuration of the at least one emergent side lens is approximated by the following equation when a pitch of the at least one incident side lens is equal to 1:

$$y = cx^2/(1+(1-(k2+1)c^2x^2)^{1/2}),$$

wherein $c \geq 5.0$ and $k2 \leq -1.5$.

* * * * *